United States Patent
Smyth et al.

(10) Patent No.: US 12,212,834 B1
(45) Date of Patent: Jan. 28, 2025

(54) CHASSIS CUT-OUT TO IMPROVE RELIABILITY AND PERFORMANCE FOR CAMERAS INCLUDING BEARING STRUCTURES

(71) Applicant: Apple Inc., Cupertino, CA (US)

(72) Inventors: Nicholas D Smyth, San Jose, CA (US); Scott W Miller, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 322 days.

(21) Appl. No.: 17/929,295

(22) Filed: Sep. 1, 2022

Related U.S. Application Data

(60) Provisional application No. 63/240,698, filed on Sep. 3, 2021.

(51) Int. Cl.
| | |
|---|---|
| *H04N 23/57* | (2023.01) |
| *G02B 7/04* | (2021.01) |
| *H02K 41/035* | (2006.01) |
| *H04N 23/51* | (2023.01) |
| *H04N 23/54* | (2023.01) |
| *H04N 23/55* | (2023.01) |

(52) U.S. Cl.
CPC .............. *H04N 23/57* (2023.01); *G02B 7/04* (2013.01); *H02K 41/0354* (2013.01); *H04N 23/51* (2023.01); *H04N 23/54* (2023.01); *H04N 23/55* (2023.01)

(58) Field of Classification Search
CPC ........ H04N 23/57; H04N 23/51; H04N 23/54; H04N 23/55; G02B 7/04; H02K 41/0354
See application file for complete search history.

(56) References Cited

U.S. PATENT DOCUMENTS

| | | | |
|---|---|---|---|
| 8,810,714 B2 * | 8/2014 | Seol ................. | H04N 23/672 396/79 |
| 9,544,482 B2 | 1/2017 | Bang et al. | |
| 10,401,590 B2 | 9/2019 | Wan et al. | |
| 10,638,031 B1 | 4/2020 | Brodie et al. | |
| 10,725,313 B2 | 7/2020 | Sugawara | |

(Continued)

FOREIGN PATENT DOCUMENTS

| | | |
|---|---|---|
| CN | 201322820 | 10/2009 |
| JP | 2009141609 | 6/2009 |

(Continued)

OTHER PUBLICATIONS

U.S. Appl. No. 17/932,254, filed Sep. 14, 2022, Bin Xu, et al.

*Primary Examiner* — Mekonnen D Dagnew
(74) *Attorney, Agent, or Firm* — Robert C. Kowert; Kowert, Hood, Munyon, Rankin & Goetzel, P.C.

(57) ABSTRACT

A device may have a multi-camera system including one or more camera modules. At least one camera module may include one or more lenses, an image sensor, and a chassis structure. The camera module may include a bearing structure including one or more stages moving on a plurality of rolling elements to allow the lenses and/or the image sensor to move in one or more directions. The chassis structure may form a limit for a span distance or length of a group of rolling elements. A portion of the chassis structure may include an opening to provide extra space to allow the span distance or length of the group of rolling elements to be extended, so as to reduce effects of raceway indentations on the rolling elements to the camera module performance.

20 Claims, 6 Drawing Sheets

(56) References Cited

U.S. PATENT DOCUMENTS

| | | | |
|---|---|---|---|
| 10,890,734 B1 | 1/2021 | Sharma et al. | |
| 10,924,644 B2* | 2/2021 | Hwang | H04N 23/57 |
| 10,924,675 B2 | 2/2021 | Hubert et al. | |
| 11,048,147 B2 | 6/2021 | Sharma | |
| 11,743,586 B2 | 8/2023 | Smyth et al. | |
| 2011/0103782 A1 | 5/2011 | Tsuruta | |
| 2013/0215284 A1 | 8/2013 | Wade | |
| 2014/0009631 A1 | 1/2014 | Topliss | |
| 2016/0241787 A1* | 8/2016 | Sekimoto | G02B 7/09 |
| 2016/0330375 A1 | 11/2016 | Sekimoto | |
| 2017/0011236 A1 | 4/2017 | Czupalla | |
| 2017/0108705 A1 | 4/2017 | Yu et al. | |
| 2019/0020822 A1 | 1/2019 | Sharma | |
| 2019/0049692 A1 | 2/2019 | Choi et al. | |
| 2019/0137728 A1 | 5/2019 | Wan et al. | |
| 2019/0141248 A1 | 5/2019 | Hubert et al. | |
| 2019/0377155 A1* | 12/2019 | Bachar | G02B 7/08 |
| 2020/0050083 A1 | 2/2020 | Jeong et al. | |
| 2020/0036362 A1 | 11/2020 | Seo et al. | |
| 2022/0014677 A1 | 1/2022 | Smyth et al. | |
| 2023/0362490 A1 | 11/2023 | Smyth et al. | |

FOREIGN PATENT DOCUMENTS

| | | |
|---|---|---|
| KR | 20100048361 | 5/2010 |
| KR | 20180064738 | 6/2018 |
| WO | 2016156996 | 10/2016 |

\* cited by examiner

CHASSIS CUT-OUT TO IMPROVE RELIABILITY AND PERFORMANCE FOR CAMERAS INCLUDING BEARING STRUCTURES

This application claims benefit of priority to U.S. Provisional Application Ser. No. 63/240,698, entitled "Chassis Cut-out to Improve Reliability and Performance for Cameras Including Bearing Structures," filed Sep. 3, 2021, and which is hereby incorporated herein by reference in its entirety.

BACKGROUND

Technical Field

This disclosure relates generally to a camera and more specifically to a camera including bearing structures and using a chassis cut-out to improve reliability.

Description of the Related Art

Mobile multipurpose devices such as smartphones, tablets, and/or pad devices are considered as a necessity nowadays. They integrate various functionalities in one small package thus providing tremendous convenience for use. Most, if not all, of today's mobile devices include at least one camera. Some cameras may incorporate an optical image stabilization (OIS) mechanism that may sense and react to external excitation/disturbance by adjusting location of an image sensor relative to a lens of the camera in an attempt to compensate for unwanted motion of the lens. Furthermore, some cameras may incorporate an autofocus (AF) mechanism whereby the object focal distance between the image sensor and the lens can be adjusted to focus an object plane in front of the camera at an image plane to be captured by the image sensor.

Sometimes, a camera may use a bearing structure to provide movability for the image sensor or the lens, and use an actuator to control movement of the movable component. For instance, the camera my use a bearing structure to suspend the movable component (e.g., the image sensor or the lens) from a stationary base structure, such that the movable component can ride on the rolling elements of the bearing structure to move in a specific direction. However, indentations can be formed at the surface of the raceway of a bearing, e.g., due to reliability issues such as aging of the bearing, time zero surface imperfection due to manufacturing tolerance, and/or damages during a drop or shock event of the camera of a mobile device. When rolling elements roll over the indentations, the indentations can cause tilt or wobble to the rolling elements. When the movable component moves on the rolling elements, this will result in unwanted spatial shift between the image sensor and lens, cause poor AF and/or OIS performance, and degrade image quality of the camera. Therefore, it is desirable to have a solution to address impacts of the raceway indentations to improve performance of a camera.

Figure 1:
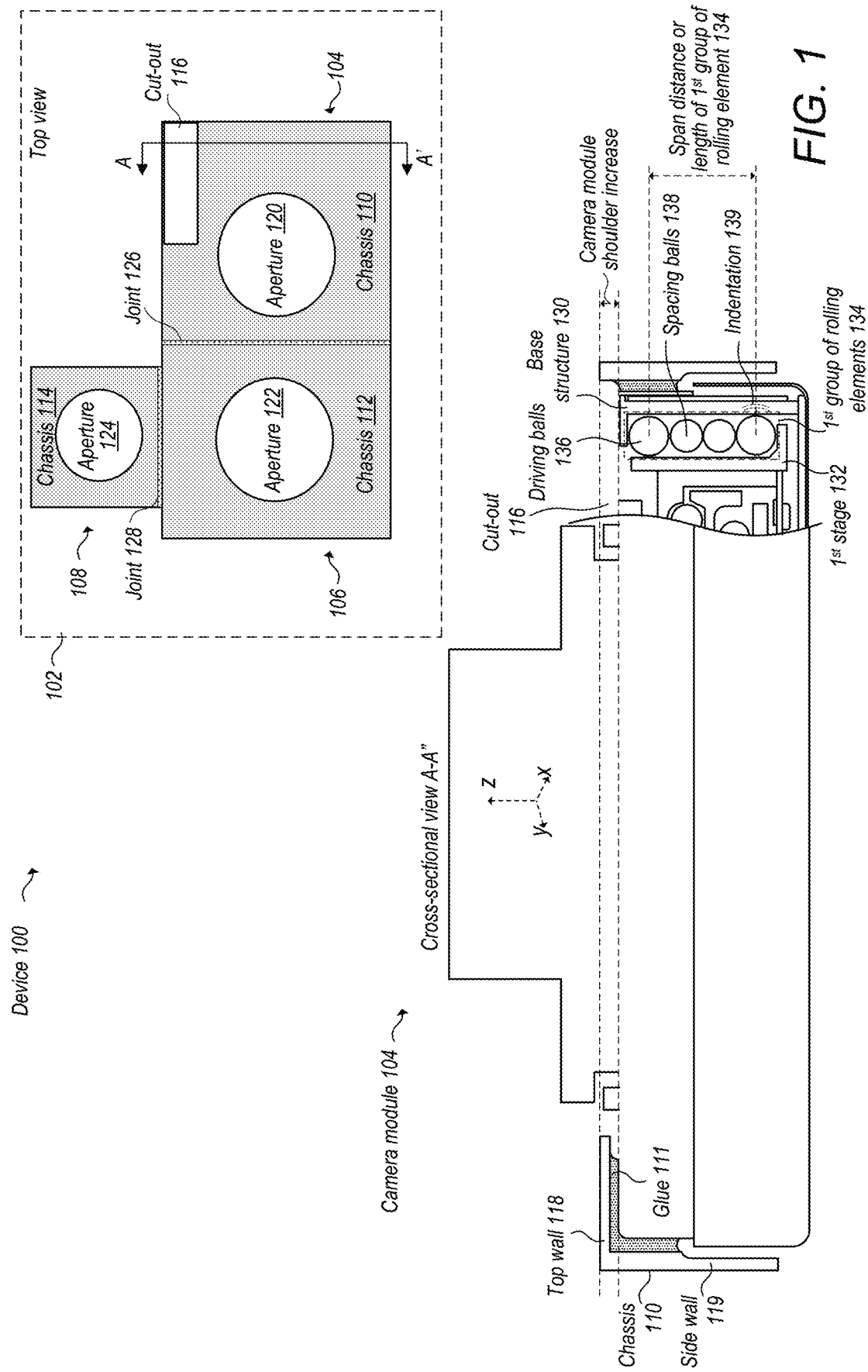
FIG. 1 shows an example device that may have a multi-camera system including a camera module with a chassis cut-out, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units. . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112 (f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a device having a multi-camera system including one or more camera modules, whereby at least one of the camera modules may use a chassis cut-out to improve reliability and image quality. In some embodiments, the at least one camera module may include a chassis structure, one or more lenses, and an image sensor. The chassis structure may include at least one aperture to pass through light to the one or more lenses. The lenses may further pass through the light to the image sensor. The image sensor may generate image signals, e.g., electrical signature, based on light received from the lenses, and the image signals may be further processed by a processor to produce an image. In some embodiments, the device may be a mobile multipurpose device, such as a smartphone, table, pad device, and the like.

In some embodiments, the lenses and/or the image sensor of the camera module may be movable relative to one another to implement various camera functions. For instance, in some embodiments, the camera module may have a bearing structure including one or more stages. A first stage may be suspended from a spatially fixed and stationary base structure by a first group of rolling elements, such that the first stage may move on the first group of rolling elements approximately in a first direction, e.g., a direction in parallel to an optical axis of the lenses (or Z-axis) to adjust a focus distance between the image sensor and the lenses to perform autofocus (AF). In addition, in some embodiments, the bearing structure may include a second stage suspending from the first stage through a second group of rolling elements such that the second stage may be movable approximately in a second direction, e.g., a direction (e.g., along X-axis direction) orthogonal to the optical axis of the lenses (or Z-axis) to compensate for unwanted misalignment between the image sensor and lenses along the second direction to implement optical image stabilization (OIS). Further, the first and second stages (e.g., the raceways at the first and second stages for the second group of rolling elements in-between) may be designed, such that the second stage may not necessarily have a degree of freedom in other directions (e.g., along Z-axis). Therefore, the second stage may move together with the first stage as the first stage moves along Z-axis. Moreover, in some embodiments, the bearing structure may include a third stage suspending from the second stage through a third group of rolling elements so as to allow the third stage to be movable approximately in a third direction, e.g., another direction (e.g., along Y-axis direction) orthogonal to the optical axis of the lenses (or Z-axis) to implement OIS in the third direction. Similarly, the bearing structure may be designed such that the third stage may move together with the second stage as the second stage moves along Y-axis, as well as moves with the first stage as the first stage moves along Z-axis. In other words, the third stage may move in Z, X, and/or Y-axis. In some embodiments, a movable component (e.g., one of the lenses and image sensor) may be mounted to the third stage, whilst the other component may be affixed to the base structure and thus stay fixed. Therefore, the movable component may move with the third stage relative to the stationary component approximately along Z-, X-, and/or Y-axis to implement AF and/or OIS functions.

In some embodiments, the camera module may use one or more actuators, such as one or more voice coil motor (VCM) actuators, to control movement of the movable component. For instance, a VCM actuator may include one or more coils and one or more corresponding magnets. The magnets may be attached to a first component, whilst the coils may be affixed to a second component. The coils may conduct current that may electromagnetically interact with magnetic fields of the magnets to generate motive force (e.g., Lorentz force) to move the first component relative to the second component. For example, consider the bearing structure described above. The magnets may be attached to the first stage, whilst the coils may be affixed to the base structure, such that the first stage may be controlled by the actuators to move relative to the base structure approximately along Z-axis.

In some embodiments, an indentation may be formed at the surface of a raceway for the rolling elements. As described above, the indentation can degrade image performance, cause poor AF and/or OIS performance, and/or actuator control instability. One way to address these issues is to increase a span distance of rolling elements. Assuming a group of rolling elements is arranged approximately in a line (e.g., a straight line along Z-axis), the span distance may broadly refer to the length of the group of rolling elements in the line, or the distance between the two rolling elements at the two ends of the group of rolling elements. When a rolling element rolls over an indentation, this rolling element may shift or wobble from its regular moving path, and thus become tilted with respect to other rolling elements. The longer the span distance or length of the group of rolling elements, the farther the other rolling elements is away from the this rolling element, and the more the tilt can be attenuated. Therefore, increase of the span distance or length of the rolling elements can reduce sensitivity of the group of rolling elements (and its associated moving component) to the indentation. Moreover, the increase of the span distance or length of the rolling elements may also increase the stroke distance for adjusting the focal distance between the lenses and the image sensor. As a result, it may also improve the performance for autofocus (AF).

In some embodiments, the chassis structure of the camera module may define a limit for the span distance or length of a group of rolling elements. Thus, to increase the span distance or length for the rolling elements, at least one portion of the chassis structure may be cut out or removed to provide extra space to allow the span distance or length of the rolling elements to be increased. For instance, in some embodiments, a top wall of the chassis in X-Y plane may be cut out to create an opening such that the span distance or length of the rolling elements may extend proximate or at least partially into the opening along Z-axis. In addition, in some embodiments, the chassis cut-out may also allow diameters of the rolling elements to be increased, which may also help to reduce the sensitivity of the rolling elements to raceway indentations. But note that the diameter increase may cause the size of the rolling elements to increase in multiple directions (e.g., also in X- and/or Y-axis), thus increasing the overall size of the camera module. In some embodiments, the bearing structure of the camera module may use balls and/or rollers (also called needle elements) as the rolling elements. As described above, in some embodiments, the device may have a multi-camera system including one or more camera modules. Thus, the chassis cut-out techniques may apply to multiple camera modules to improve reliability.

FIG. 1 shows an example device that includes a multi-camera system, according to some embodiments. For purposes of illustration, only relevant components are displayed in the figure. In this example, device 100 may include multi-camera system 102 that may include camera modules 104, 106, and 108. Camera modules 104, 106, and 108 may individually include chassis structures 110, 112, and 114. In some embodiments, chassis structures 110, 112, and/or 114 may be formed using metal sheets. For instance, a process may include deep drawing one or more sheets of metal (e.g., stainless steel, copper alloy, etc.) to form, at least in part, chassis structures 110, 112 and/or 114. In some embodiments, chassis structures 110, 112, and 114 may be welded together at joints 126 and 128. Alternatively, chassis structures 110, 112, and 114 may be formed as a single integral piece. For instance, in some embodiments, chassis structures 110 and 112 may be formed as one single piece, whilst chassis structure 114 may be a separate piece and welded with chassis structures 110 and 112. In some embodiments, chassis structures 110, 112, and 114 may individually include apertures 120, 122, and 124 to receive at least a corresponding portion of camera modules 104, 106, and 108. For instance, aperture 120 may be formed at top wall 118 of chassis structure 110 to receive a portion of the lens holder that contains one or more lenses of camera module 104. Aperture 120 may allow light to pass through to the one or more lenses to capture images. As indicated in FIG. 1, chassis structure 110 may include cut-out portion 116, e.g., at top wall 118. As a result, chassis structure 110 may have a "hybrid" structure, whereby at least a portion of top wall 118 may be present and at least a portion of top wall 118 may be cut out and removed. As indicated in FIG. 1, in some embodiments, cut-out portion 116 may be a separate opening from the aperture of camera module 104 (e.g., aperture 120).

As indicated in the cross-sectional view from perspective A-A' in FIG. 1, camera module 104 may include a first group of rolling elements 134 (e.g., extending along Z-axis on the right) inside camera module 104. The group of rolling elements 134 may suspend a first stage 132 from stationary base structure 130. The first group of rolling elements 134 may be retained in a raceway (also called groove) between first stage 132 and base structure 130, such that rolling elements 136 and 138 may rotate locally inside the raceway between first stage 132 and base structure 130. As a result, the first stage 132 may move on the first group of rolling elements 134 approximately along Z-axis. The raceway between base structure 130 and/or first stage 132 may be in one of many possible shapes. For instance, in some embodiments, the raceway may be in a V-shape. Alternatively, in some embodiments, the raceway may be in a circular or trapezoidal shape. In addition, in this example, for purposes of illustration, it is assumed that rolling elements 136 and 138 are balls. Alternatively, in some embodiments, rolling elements 136 and 138 may be rollers or needle elements. As indicated in FIG. 1, rolling elements 136 at the ends of the first group of rolling elements 134 may have larger diameters than intermediate rolling elements 138 in-between. Thus, rolling elements 136 may be called driving balls 136 because they provide the suspension between the first stage 132 and base structure 130 as they can touch the first stage 132 and base structure 130 at a same time. By comparison, intermediate rolling elements 138 may be called spacing balls 138 because they primarily provide spacing between driving balls 136. As indicated in FIG. 1, the span distance or length of the first group of rolling elements 134 may be measured from a center of a first driving ball 136 at the bottom to a center of a second driving ball 136 at the top.

In some embodiments, chassis structure 110 may include one top wall 118 (e.g., in the X-Y plane) that may include aperture 120, and one or more side walls 119 adjacent top wall 118. Chassis 110 may be attached with camera module 104 using glue 111. As indicated in FIG. 1, top wall 118 may define a limit for the span distance or length of the first group of rolling elements 134, or the length of the raceway of the first group of rolling elements 134. Thus, in some embodiments, a portion of top wall 118 of chassis structure 110 (and an associate portion of glue 111) may be removed to create cut-out portion 116, as indicated on the right side inside camera module 104. As a result, the shoulder of camera module 104 may be elevated (e.g., along Z-axis), an opening above the first group of rolling elements 134 may become available, and thus its span distance or length may be increased. For purposes of illustration, the space distance of the first group of rolling elements 134 is shown to extend up to approximately the lower edge of cut-out portion 116 in FIG. 1. In some embodiments, the space distance may extend at least partially into the opening created by cut-out portion 116, e.g., beyond the lower edge but may or may not extend beyond the upper edge of cut-out portion 116. As described above, increase of the span distance or length of the first group of rolling elements 134 may reduce the sensitivity of the rolling elements to a raceway indentation 139. For instance, the first driving ball 136(1) at the bottom rolls over indentation 139, and thus tilts with respect to the second driving ball 136(2) at the top. As the span distance or length between the two driving balls is extended, the tilt may be further attenuated. In some embodiments, a movable component of camera module 104 (e.g., the lenses) may be placed closer to the second driving ball 138 at the top (as described below in FIG. 2). Thus, the effect of indentation 139 to position of the movable component may be lessened.

In some embodiments, cut-out 116 of chassis structure 110 may allow the span distance or length of the first group of rolling elements 134 to be increased by a few hundreds of micrometers.

Figure 2:
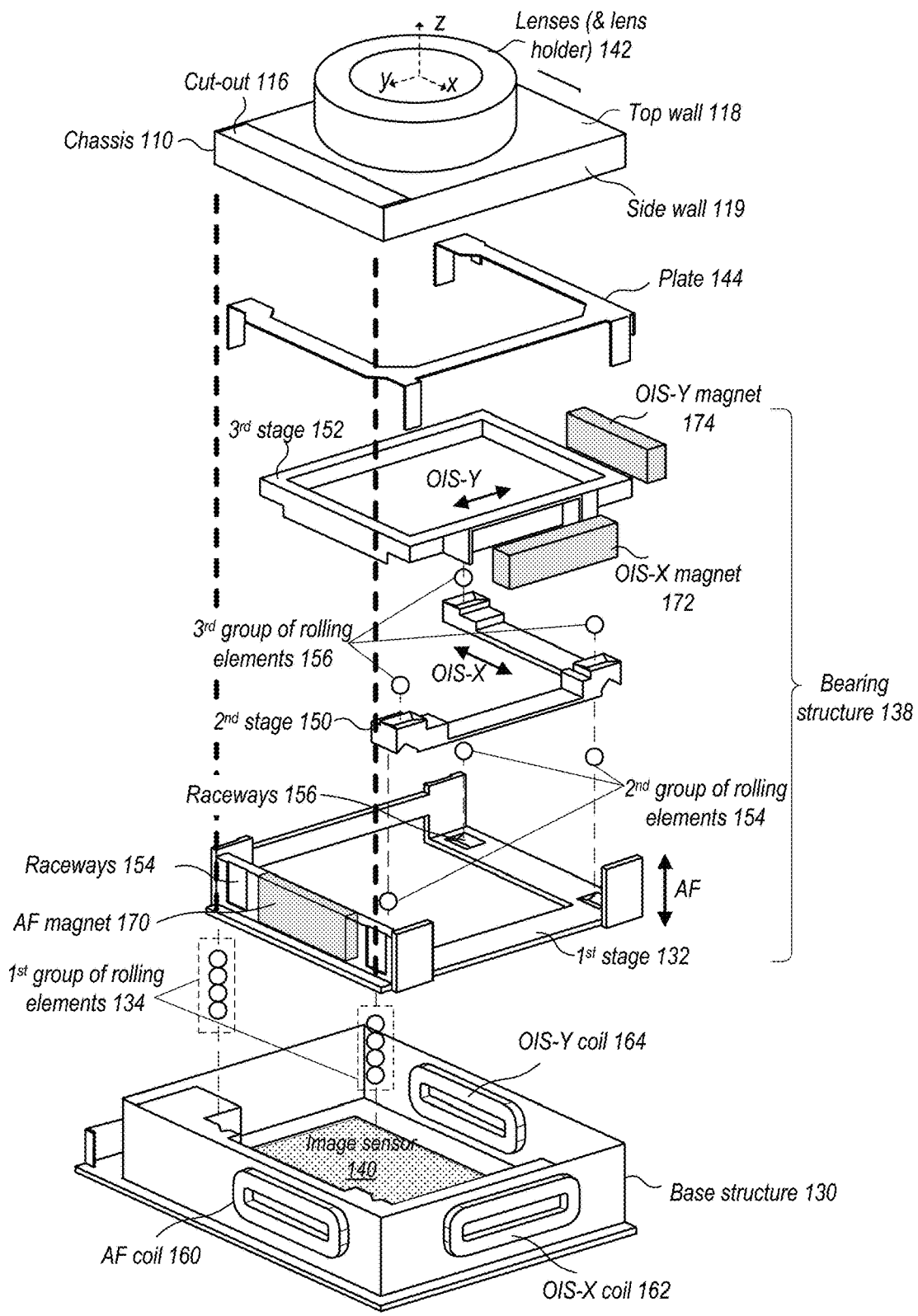
FIG. 2 is an exploded view an example camera, according to some embodiments.

FIG. 2 is an exploded view to further illustrate an internal structure of camera module 104, according to some embodiments. For purposes of illustration, an optical coordinate system is displayed, where an optical axis of one or more lenses 142 of camera module 104 is defined as Z-axis. In FIG. 2, camera module 104 may include lenses 142 (contained in a lens holder) and image sensor 140. In this example, image sensor 140 may be attached to a substrate that may be further affixed to base structure 130. Lenses 142 (and the lens holder) may be attached to bearing structure 138 that may be suspended from base structure 130 using bearing structure 138. Thus, image sensor 140 may be spatially fixed and stationary, whilst lenses 142 may be movable in different directions (thus called a "lens-shift" structure). As indicated in FIG. 2, bearing structure 138 may include the first stage 132 that may be suspended from base structure 130 using the first group of rolling elements 134. As described above, the first group of rolling elements 134 may be placed into a raceway between the first stage 132 and base structure 130, such that the first stage 132 may move on the first group of rolling elements 134 approximately in a first direction in parallel to the optical axis of lenses 142 (e.g., Z-axis). In other words, the first stage 132 may move relative to base structure 130 (and image sensor 140) along Z-axis to implement AF, as indicated by the arrow in FIG. 2. In some embodiments, camera module 104 may include one or more light folding element, such as one or more mirrors or prisms, to reflect and change the direction of light transmitting within camera module 104.

In addition, in some embodiments, bearing structure 138 may include a second stage 150 that may be suspended from the first stage 132 via a second group of rolling elements 154. The raceway for the second group of rolling elements 154 between the first stage 132 and the second stage 150 (e.g., raceway 156 at the second stage 150) may be designed such that the second group of rolling elements 154 (e.g., extending along X-axis) may have the degree of movement freedom along X-axis, but not in other directions (e.g., along Z-axis). As a result, the second stage 150 may move relative to the first stage 132 along X-axis thus implementing OIS in X-axis, as indicted by the arrow in FIG. 2. In addition, the second stage 150 may have to move together with the first stage 132 as the first stage 132 moves relative to base structure 130 along Z-axis.

Moreover, in some embodiments, bearing structure 138 may include a third stage 152 that may be suspended from the second stage 150 through a third group of rolling elements 156 and an associated raceway (e.g., extending along Y-axis). Similarly, the third stage 152 may move relative to the second stage 150 along Y-axis thus implementing OIS in Y-axis, but may have not to move with the second stage 150 in other directions. Thus, the third stage 152 itself may move approximately along Y-axis. In addition, when the second stage 150 moves approximately along X-axis, the third stage 152 may also move together with the second stage 150 along X-axis; and when the first stage 132 moves approximately along Z-axis, the second stage 150 and third stage 152 may move together with the first stage 132 along Z-axis. In other words, the third stage 152 may be movable approximately along Z-, X-, and/or Y-axis. In some embodiments, lenses 142 of camera module 104 may be affixed to the third stage 152 through plate 144, and accordingly become movable as well relative to image sensor 140 along Z-, X-, and/or Y-axis.

In some embodiments, camera module 104 may use one or more actuators, e.g., one or more VCM actuators, to control movement of lenses 142. For instance, in FIG. 2, the actuators of camera module 104 may include AF coil 160, OIS-X coil 162, and/or OIS-Y coil 164 affixed to base structure 130. In addition, the actuators may include AF magnet 170 affixed to first stage 132, as well OIS-X magnet 172 and/or OIS-Y magnet 174. AF coil 160 may conduct current that may interact with the magnetic field of AF magnet 170 to generate motive force (e.g., Lorentz force) to cause AF magnet 170 (and the first stage 132) to move approximately along Z-axis. Similarly, OIS-X coil 162 and OIS-Y coil 164 may respectively electromagnetically interact with OIS-X magnet 172 and OIS-Y magnet 174 to move the second stage 150 and third stage 152 approximately along X-axis and Y-axis. As a result, the actuators may be used to control the location of lenses 142 relative to image sensor 140 along Z-, X- and/or Y-axis. Note that camera module 104 in FIGS. 1-2 is presented only as an example for purposes of illustration and is not intended to limit the present disclosure. In some embodiments, the stack-up sequence of the stages of bearing structure 138 may be different. For instance, in some embodiments, the first stage 132 may be stacked on top of the second stage 150, and the third stage 152 may then ride on top of the first stage 132. In addition, in some embodiments, camera module 104 may use a sensor-shift structure, not the lens-shift structure. For instance, lenses 142 may be fixed, whilst image sensor 140 may be mounted to one stage of bearing structure 138 (e.g., the third stage 152) to be thus movable in the one or more directions. Alternatively, in some embodiments, both lenses 142 and image sensor 140 may be movable (e.g., camera module 104 including both lens-shift and sensor-shift structures). For instance, lenses 142 may be movable along Z-axis to perform AF, whilst image sensor 140 may be movable along X- and/or Y-axis to implement OIS. But regardless of the different designs, the techniques disclosed herein may be still applied to use a chassis cut-out to increase a bearing span distance or length for a group of rolling elements to reduce the effect of raceway indentations. As indicated in FIG. 2, camera module 104 may include at least an opening through top wall 118 created by chassis cut-out portion 116 at top wall 118, which may be positioned above the first group of rolling elements 134. As a result, the span distance or length of the first group of rolling elements may extend proximate or at least partially into the opening created by chassis cut-out portion 116. Note that for purposes of illustration, in FIG. 2, cut-out portion 116 is shown to extend fully between the two opposite sides of chassis 110. In some embodiments, cut-out portion 116 may extend only partially (e.g., as shown in FIG. 4).

Figure 3:
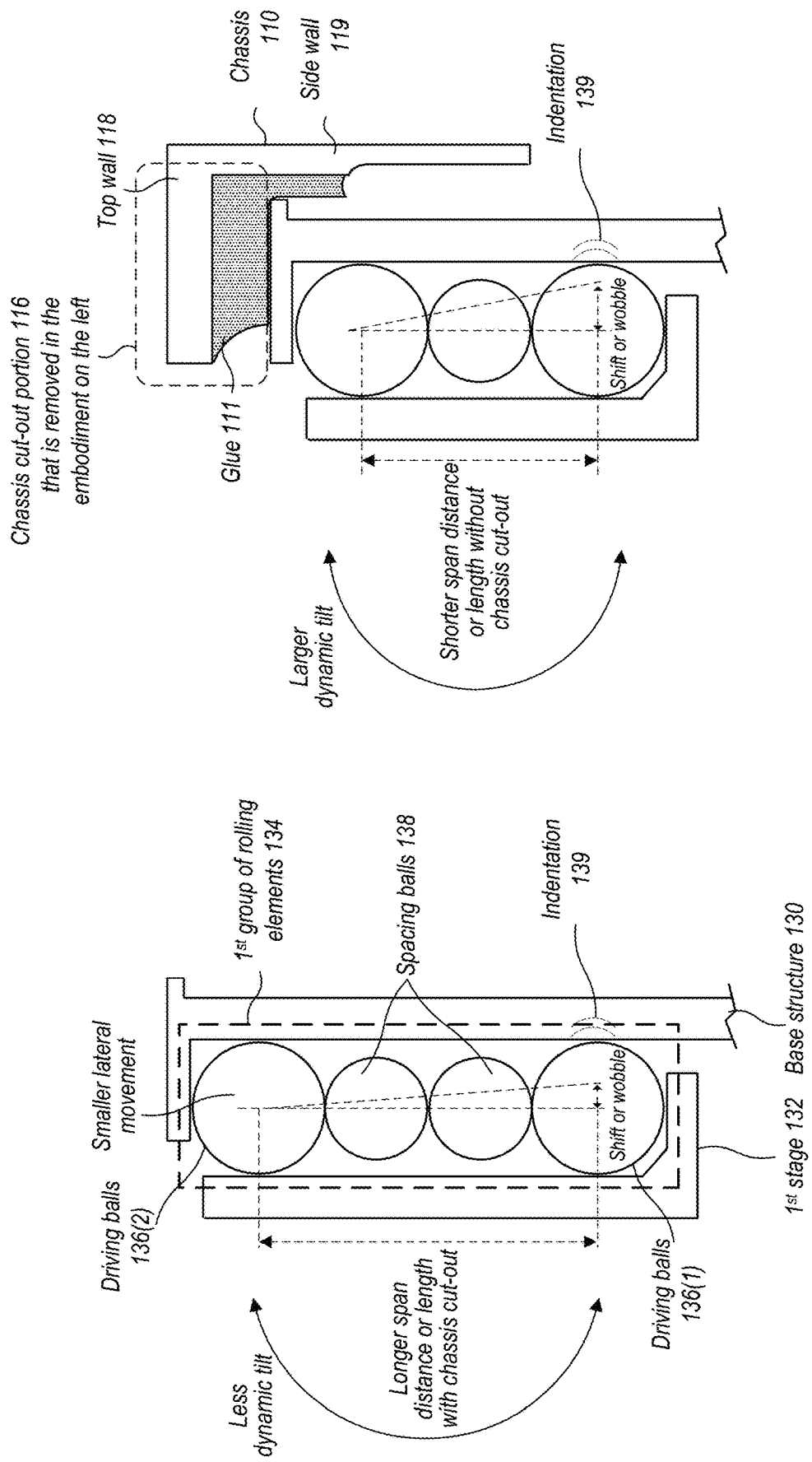
FIG. 3 is a schematic diagram showing benefits of an increased bearing span distance or length, according to some embodiments.

FIG. 3 is a schematic diagram to show benefits of an increased bearing span distance or length, according to some embodiments. In FIG. 3, the diagram on the left shows the first group of rolling elements 134 that may suspend the first stage 132 from base structure 130 with chassis cut-out portion 116, whilst the diagram on the right shows an alternative embodiment without a chassis cut-out. As indicated in FIG. 3, top wall 118 of chassis structure 110 may form a limit for the span distance or length of the first group of rolling elements 134, e.g., along Z-axis. Thus, with chassis cut-out portion 116, at least a portion of top wall 118 of chassis structure 110 (and an associated portion of glue 111) may be removed and an opening may be created. Thus, the span distance or length of the first group of rolling elements 134 may extend proximate or at least partially into the opening to be increased. For instance, the raceway between base structure 130 and the first stage 132 may be extended longer (e.g., along Z-axis) to become proximate or at least partially into the opening, and more spacing balls 138 in the first group of rolling elements 134 may be added (e.g., from one to two), such that the space distance between the two driving balls 136 at the two ends may grow longer. In FIG. 3, when the bearing span distance or length is increased, the driving ball 136(2) at the top may be farther away from the driving ball 136(1) at the bottom. As a result, when the driving ball 136(1) rolls over indentation 139 at the surface of the raceway at base structure 130, the tilt between the bottom driving ball 136(1) with respect to the top driving ball 136(2) may be reduced given the trigonometric relationship as indicated in FIG. 3. In other words, considering the top driving ball 136(2) as a reference point, the bottom driving ball 136(1) may shift less with respect to this reference point when the span distance or length between the two driving balls increases. Referring back to FIG. 2, the movable lenses 142 may reside on top of the first stage 132 that further moves on the first group of rolling elements including the driving balls 136. Therefore, the sensitivity of the position shift of lenses 142 with respect to indentation 139 may be reduced. Note that in some embodiments, at least a portion of side walls 119 adjacent top wall 118 of chassis structure 110 may be removed so as to allow the span distance or length of another group of rolling elements to be increased. For instance, a cut-out portion at side walls 119 at the position Y-axis may allow the span distance or length of the third group of rolling elements 156 (extending along Y-axis) to be increased along Y-axis.

Figure 4:
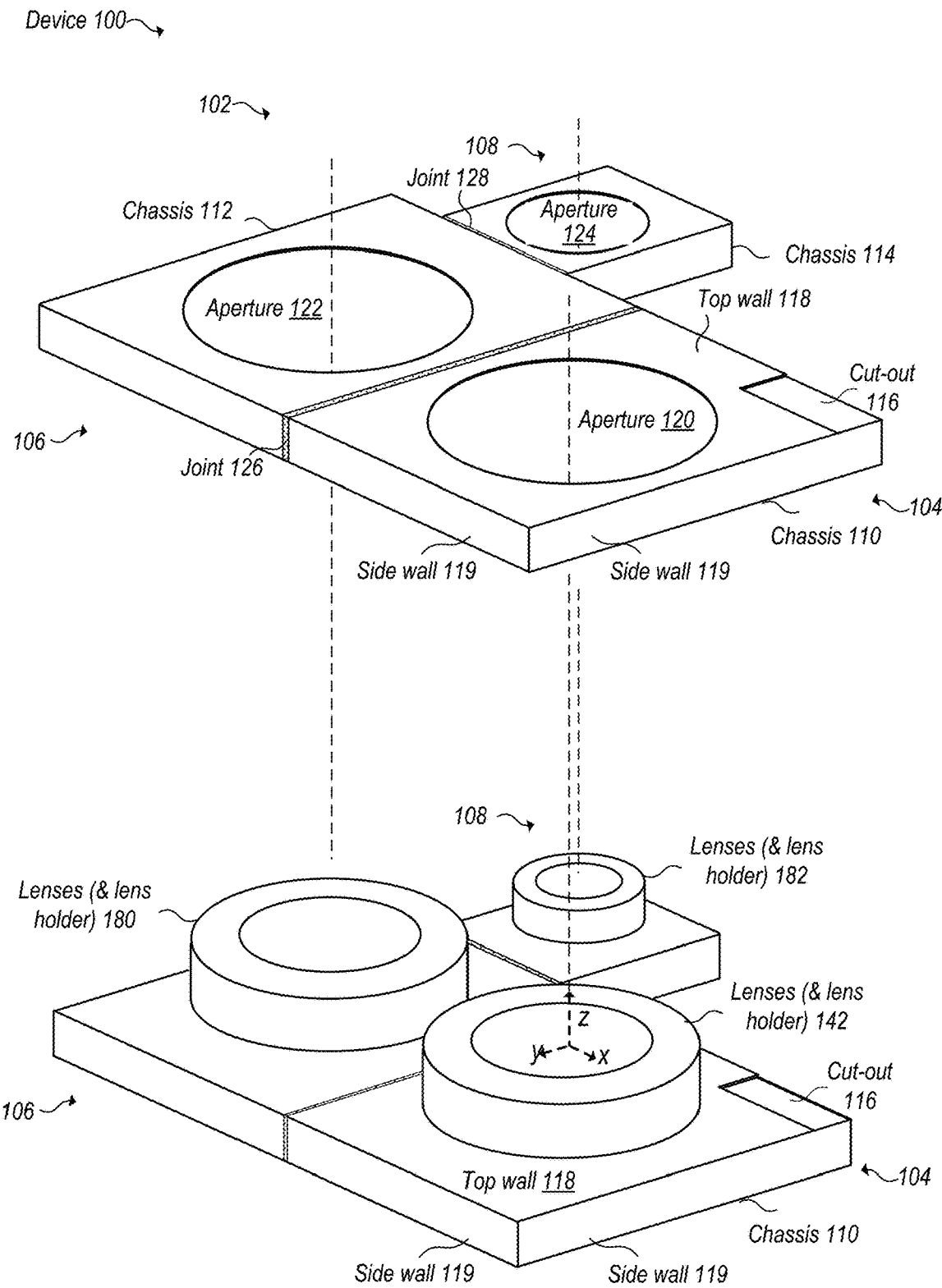
FIG. 4 shows example chassis structures of a device including a multi-camera system, according to some embodiments.

FIG. 4 shows example chassis structures of a device including a multi-camera system, according to some embodiments. In FIG. 4, in some embodiments, multi-camera system 102 of device 100 may include camera modules 104, 106, and 108. Camera modules 104, 106, and 108 may individually include chassis structures 110, 112, and 114. As described above, chassis structures 110, 112, and/or 114 may be formed as separate components that are welded together (e.g., at joints 116 and 118), or alternatively as a single integral piece. Further, chassis structures 110, 112, and/or 114 may individually include at least one top wall and one or more side walls adjacent the at least one top wall. For instance, chassis structure 110 may include top wall 118 and several side walls 119 adjacent top wall 118. In some embodiments, there may be electrical wires routed across chassis structures 110, 112, and 114 in order to transfer power and/or other electrical signals between camera modules 104, 106, and 108. As indicated in FIG. 4, chassis structures 110, 112, and 114 may individually include apertures 120, 122, and 124 to receive at least a corresponding portion of camera modules 104, 106, and 108. For instance, chassis structure 110 may include aperture 120 at top wall 118 to receive at least a portion of the lens holder (containing lenses 142) of camera module 104. Similarly, chassis structure 112 may include aperture 122 to receive at least a portion of the lens holder (containing lenses 180) for camera module 106, and chassis structure 114 may include aperture 124 to receive at least a portion of the lens holder (containing lenses 182) for camera module 108. As indicated in FIG. 4, chassis structure 110 may include cut-out portion 116 at top wall 118 to allow the span distance or length of the first group of rolling elements 134 to be increased, e.g., along Z-axis. In this example, top wall 118 may be oriented to reside in the X-Y plane, and cut-out portion 116 may allow the span distance or length of the first group of rolling elements 134 to be extended along Z-axis. As described above, in some embodiments, one or more portions of side walls 116 may be also cut out and removed to create an opening to allow the span distance or length of another group of rolling elements to be increased. Moreover, the chassis cut-out techniques described above may be also applied to camera modules 106 and/or 108.

Figure 5:
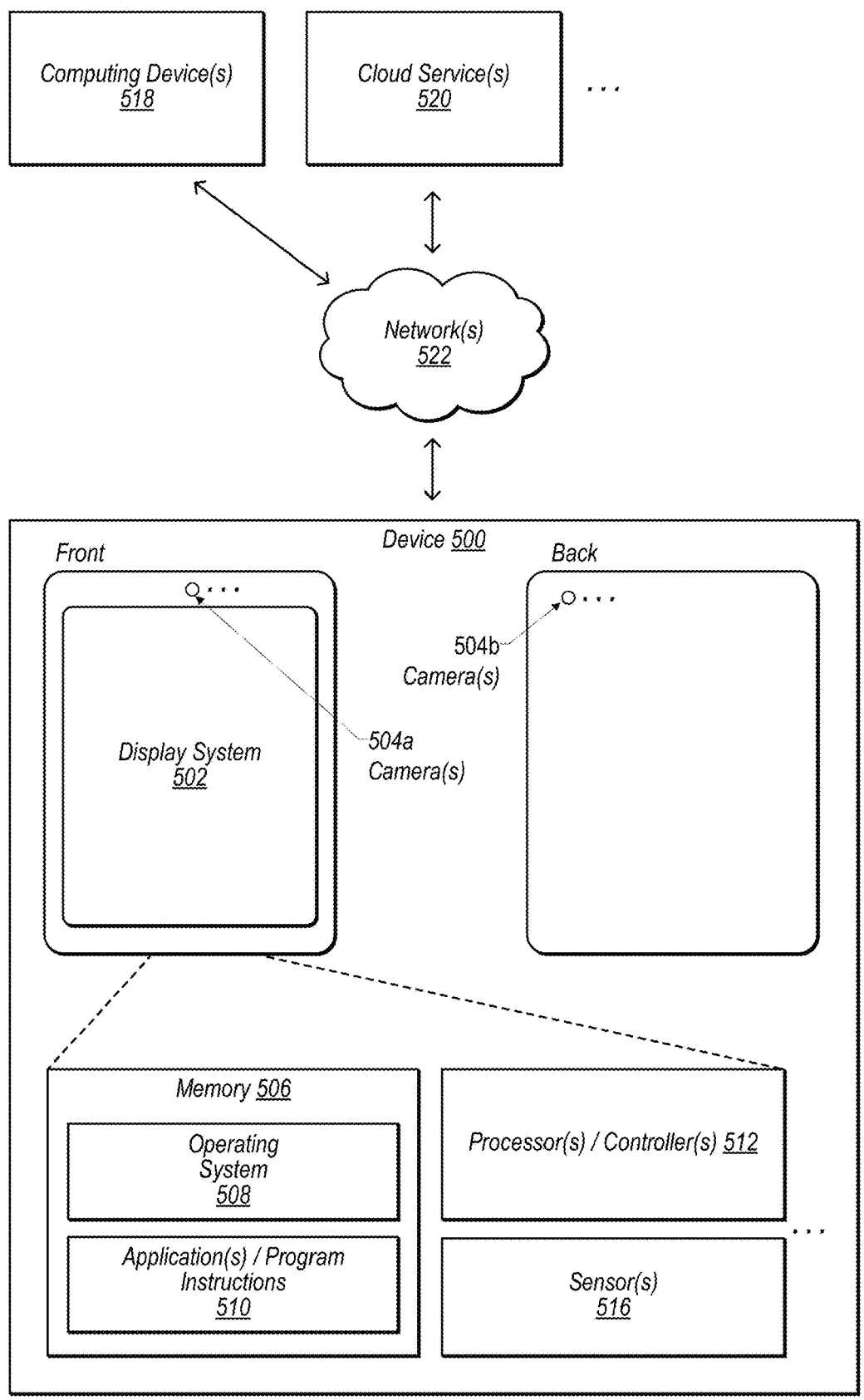
FIG. 5 shows a schematic representation of an example device that have a multi-camera system including a camera module with a chassis cut-out, according to some embodiments.

FIG. 5 illustrates a schematic representation of an example device 500 that may have a multi-camera system including a camera module with a chassis cut-out, e.g., as described herein with reference to FIGS. 1-4, according to some embodiments. In some embodiments, the device 500 may be a mobile device and/or a multifunction device. In various embodiments, the device 500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 500 may include a display system 502 (e.g., comprising a display and/or a touch-sensitive surface) and/or one or more cameras 504. In some non-limiting embodiments, the display system 502 and/or one or more front-facing cameras 504a may be provided at a front side of the device 500, e.g., as indicated in FIG. 5. Additionally, or alternatively, one or more rear-facing cameras 504b may be provided at a rear side of the device 500. In some embodiments comprising multiple cameras 504, some or all of the cameras may be the same as, or similar to, each other. Additionally, or alternatively, some or all of the cameras may be different from each other. In various embodiments, the location(s) and/or arrangement(s) of the camera(s) 504 may be different than those indicated in FIG. 5.

Among other things, the device 500 may include memory 506 (e.g., comprising an operating system 508 and/or application(s)/program instructions 510), one or more processors and/or controllers 512 (e.g., comprising CPU(s), memory controller(s), display controller(s), and/or camera controller(s), etc.), and/or one or more sensors 516 (e.g., orientation sensor(s), proximity sensor(s), and/or position sensor(s), etc.). In some embodiments, the device 500 may communicate with one or more other devices and/or services, such as computing device(s) 518, cloud service(s) 520, etc., via one or more networks 522. For example, the device 500 may include a network interface (e.g., network interface 610) that enables the device 500 to transmit data to, and receive data from, the network(s) 522. Additionally, or alternatively, the device 500 may be capable of communicating with other devices via wireless communication using any of a variety of communications standards, protocols, and/or technologies.

Figure 6:
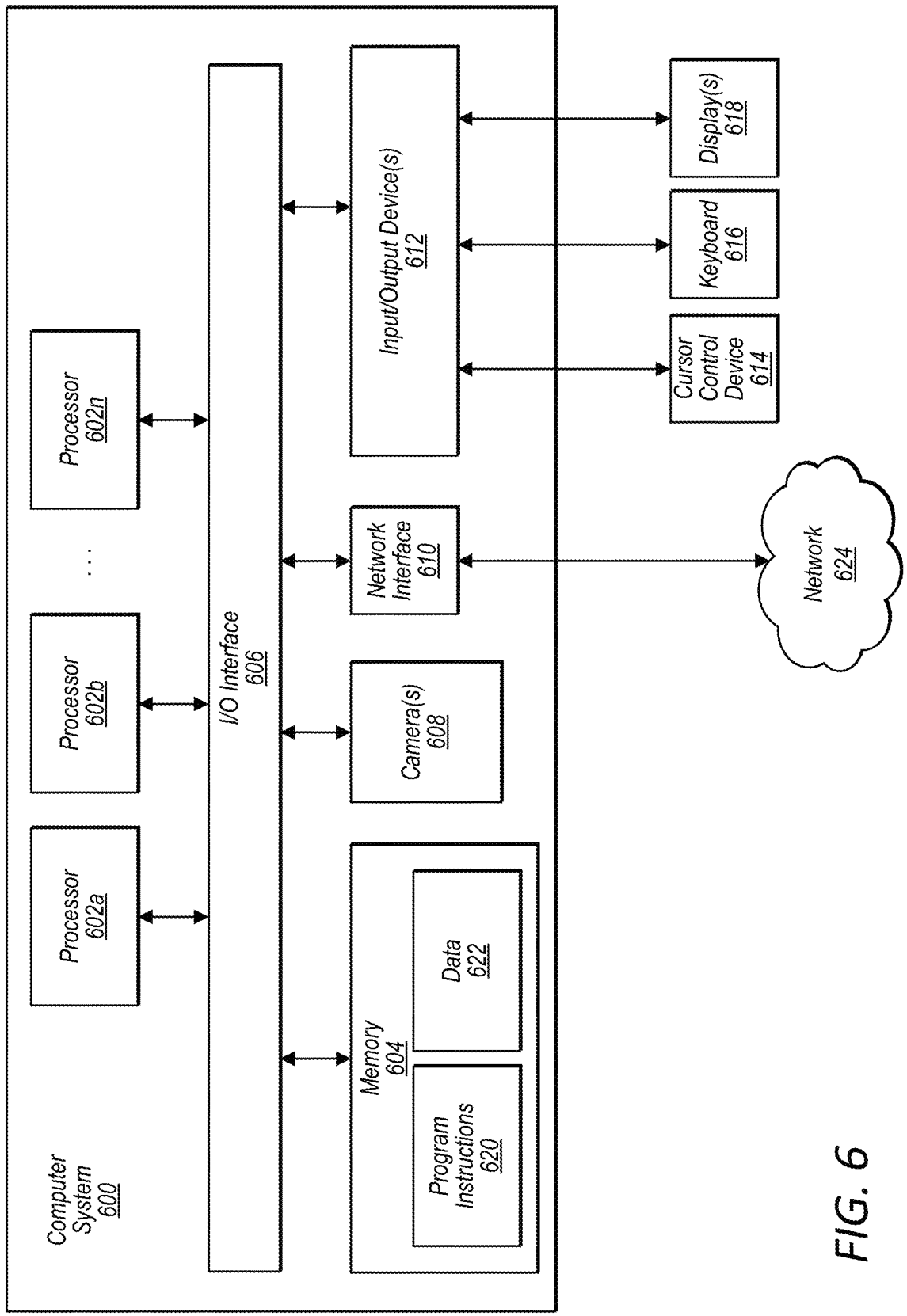
FIG. 6 shows a schematic block diagram of an example computer system that have a multi-camera system including a camera module with a chassis cut-out, according to some embodiments.

FIG. 6 illustrates a schematic block diagram of an example computing device, referred to as computer system 600, that may include or host embodiments of a multi-camera system including a camera module with a chassis cut-out, e.g., as described herein with reference to FIGS. 1-5, according to some embodiments. In addition, computer system 600 may implement methods for controlling operations of the camera and/or for performing image processing images captured with the camera. In some embodiments, the device 500 (described herein with reference to FIG. 5) may additionally, or alternatively, include some or all of the functional components of the computer system 600 described herein.

The computer system 600 may be configured to execute any or all of the embodiments described above. In different embodiments, computer system 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 600 includes one or more processors 602 coupled to a system memory 604 via an input/output (I/O) interface 606. Computer system 600 further includes one or more cameras 608 coupled to the I/O interface 606. Computer system 600 further includes a network interface 610 coupled to I/O interface 606, and one or more input/output devices 612, such as cursor control device 614, keyboard 616, and display(s) 618. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 602, or a multiprocessor system including several processors 602 (e.g., two, four, eight, or another suitable number). Processors 602 may be any suitable processor capable of executing instructions. For example, in various embodiments processors 602 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 602 may include additional types of processors, such as graphics processing units (GPUs), application specific integrated circuits (ASICs), etc. In multiprocessor systems, each of processors 602 may commonly, but not necessarily, implement the same ISA. In some embodiments, computer system 600 may be implemented as a system on a chip (SoC). For example, in some embodiments, processors 602, memory 604, I/O interface 606 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 604 may be configured to store program instructions 620 accessible by processor 602. In various embodiments, system memory 604 may be implemented using any suitable memory technology, such as static random access memory (SRAM), synchronous dynamic RAM (SDRAM), nonvolatile/Flash-type memory, or any other type of memory. Additionally, existing camera control data 622 of memory 604 may include any of the information or data structures described above. In some embodiments, program instructions 620 and/or data 622 may be received, sent or stored upon different types of computer-accessible media or on similar media separate from system memory 604 or computer system 600. In various embodiments, some or all of the functionality described herein may be implemented via such a computer system 600.

In one embodiment, I/O interface 606 may be configured to coordinate I/O traffic between processor 602, system memory 604, and any peripheral devices in the device, including network interface 610 or other peripheral interfaces, such as input/output devices 612. In some embodiments, I/O interface 606 may perform any necessary protocol, timing or other data transformations to convert data signals from one component (e.g., system memory 604) into a format suitable for use by another component (e.g., processor 602). In some embodiments, I/O interface 606 may include support for devices attached through various types of peripheral buses, such as a variant of the Peripheral Component Interconnect (PCI) bus standard or the Universal Serial Bus (USB) standard, for example. In some embodiments, the function of I/O interface 606 may be split into two or more separate components, such as a north bridge and a south bridge, for example. Also, in some embodiments some or all of the functionality of I/O interface 606, such as an interface to system memory 604, may be incorporated directly into processor 602.

Network interface 610 may be configured to allow data to be exchanged between computer system 600 and other devices attached to a network 624 (e.g., carrier or agent devices) or between nodes of computer system 600. Network 624 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 610 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 612 may, in some embodiments, include one or more display terminals, keyboards, keypads, touchpads, scanning devices, voice or optical recognition devices, or any other devices suitable for entering or accessing data by one or more computer systems 600. Multiple input/output devices 612 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 610.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
    a chassis structure including an aperture at a top wall of the chassis structure;
    one or more lenses configured to receive light passing through the aperture of the chassis structure;
    an image sensor configured to generate image signals based on the light passing through the one or more lenses; and
    a bearing structure including a plurality of stages configured to move on a plurality of rolling elements so as to allow the one or more lenses or the image sensor to move relative to one another in one or more directions,
    wherein the top wall of the chassis structure includes an opening such that a span distance of the first group of the rolling elements extends proximate or at least partially into the opening of the top wall of the chassis structure.

2. The system of claim 1, wherein the plurality of stages of the bearing structure includes a first stage configured to move on the first group of the rolling elements to allow the one or more lenses or the image sensor to move in a first direction in parallel to an optical axis of the one or more lenses.

3. The system of claim 2, wherein the plurality of stages of the bearing structure includes a second stage configured to move on a second group of the rolling elements to allow the one or more lenses or the image sensor to move in a second direction orthogonal to the optical axis of the one or more lenses.

4. The system of claim 3, wherein the plurality of stages of the bearing structure includes a third stage configured to move on a third group of the rolling elements to allow the one or more lenses or the image sensor to move in a third direction orthogonal to the optical axis of the one or more lenses.

5. The system of claim 4,
    wherein the second stage is suspended from the first stage via the second group of the rolling elements, such that the second stage moves with the first stage as the first stage moves on the first group of the rolling elements in the first direction in parallel to the optical axis of the one or more lenses, and
    wherein the third stage is suspended from the second stage via the third group of the rolling elements, such that the third stage moves with the second stage as the second stage moves on the second group of the rolling elements in the second direction orthogonal to the optical axis of the one or more lenses and moves with the first stage as the first stage moves on the first group of the rolling elements in the first direction in parallel to the optical axis of the one or more lenses.

6. The system of claim 5, wherein the one or more lenses or the image sensor is affixed to the third stage of the bearing suspension structure.

7. The system of claim 1, wherein the chassis structure is formed using one or more sheets of metal.

8. The system of claim 1, wherein the first group of the rolling elements includes balls of different diameters.

9. The system of claim 1, wherein the plurality of rolling elements are balls or rollers.

10. The system of claim 1, wherein the chassis structure includes a side wall adjacent the top wall defining, and wherein the side wall includes an opening such that a span distance of the second group or the rolling elements extends proximate or at least partially into the opening of the top wall of the chassis structure.

11. A device, comprising:
one or more processors;
memory storing program instructions executable by the one or more processors to control operation of one or more camera modules of a multi-camera system; and
the multi-camera system including the one or more camera modules, wherein at least one of the one or more camera modules comprises:
a chassis structure including an aperture at a top wall of the chassis structure;
one or more lenses configured to receive light passing through the aperture of the chassis structure;
an image sensor configured to receive the light passing through the one or more lenses; and
a bearing structure including a plurality of stages configured to move on a plurality of rolling elements so as to allow the one or more lenses or the image sensor to move relative to one another in one or more directions,
wherein the top wall of the chassis structure includes an opening such that a span distance of the first group or the rolling elements extends proximate or at least partially into the opening of the top wall of the chassis structure.

12. The device of claim 11, wherein the plurality of stages of the bearing structure includes a first stage configured to move on the first group of the rolling elements to allow the one or more lenses or the image sensor to move in a first direction in parallel to an optical axis of the one or more lenses.

13. The device of claim 12, wherein the plurality of stages of the bearing structure includes a second stage configured to move on a second group of the rolling elements to allow the one or more lenses or the image sensor to move in a second direction orthogonal to an optical axis of the one or more lenses.

14. The device of claim 13, wherein the plurality of stages of the bearing structure includes a third stage configured to move on a third group of the rolling elements to allow the one or more lenses or the image sensor to move in a third direction orthogonal to the optical axis of the one or more lenses.

15. The device of claim 14,
wherein the second stage is suspended from the first stage via the second group of the rolling elements, such that the second stage moves with the first stage as the first stage moves on the first group of the rolling elements in the first direction in parallel to the optical axis of the one or more lenses, and
wherein the third stage is suspended from the second stage via the third group of the rolling elements, such that the third stage moves with the second stage as the second stage moves on the second group of the rolling elements in the second direction orthogonal to the optical axis of the one or more lenses and moves with the first stage as the first stage moves on the first group of the rolling elements in the first direction in parallel to the optical axis of the one or more lenses.

16. The device of claim 15, wherein the one or more lenses or the image sensor is affixed to the third stage of the bearing suspension structure.

17. The device of claim 11, wherein the chassis structure is formed by deep drawing one or more sheets of metal.

18. The device of claim 11, wherein the first group of the rolling elements includes balls of different diameters.

19. The device of claim 11, wherein the plurality of rolling elements includes balls or rollers.

20. The device of claim 11, wherein the chassis structure includes a side wall adjacent the top wall, and wherein the side wall includes an opening such that a span distance of the second group or the rolling elements extends proximate or at least partially into the opening of the top wall of the chassis structure.

* * * * *